(12) United States Patent
Ahmad et al.

(10) Patent No.: US 12,177,881 B2
(45) Date of Patent: Dec. 24, 2024

(54) SCHEDULING TIME-CRITICAL DATA ON A RADIO INTERFACE

(71) Applicant: Microsoft Technology Licensing, LLC, Redmond, WA (US)

(72) Inventors: Syed Toaha Ahmad, Renton, WA (US); Emily Po-Kay Chung, Mountain View, CA (US); Ivan Simoes Gaspar, West Linn, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 350 days.

(21) Appl. No.: 17/703,793

(22) Filed: Mar. 24, 2022

(65) Prior Publication Data

US 2023/0309136 A1 Sep. 28, 2023

(51) Int. Cl.
*H04W 72/543* (2023.01)
*H04W 72/12* (2023.01)
*H04W 72/23* (2023.01)

(52) U.S. Cl.
CPC ..... *H04W 72/543* (2023.01); *H04W 72/1221* (2013.01); *H04W 72/23* (2023.01)

(58) Field of Classification Search
None
See application file for complete search history.

(56) References Cited

U.S. PATENT DOCUMENTS

| 12,058,733 B2* | 8/2024 | Wang | H04W 76/28 |
| 2017/0164345 A1* | 6/2017 | Goto | H04W 16/14 |
| 2020/0259896 A1 | 8/2020 | Sachs et al. | |
| 2020/0305191 A1* | 9/2020 | Moon | H04W 72/23 |
| 2021/0081035 A1* | 3/2021 | West | G06T 17/20 |
| 2021/0385825 A1* | 12/2021 | Meylan | H04W 72/1273 |
| 2022/0159506 A1* | 5/2022 | Liu | H04W 72/12 |
| 2022/0253269 A1* | 8/2022 | Su | G02B 27/0101 |
| 2022/0338215 A1* | 10/2022 | Huang | H04W 72/21 |
| 2024/0015735 A1* | 1/2024 | Callard | H04W 72/21 |

FOREIGN PATENT DOCUMENTS

KR 20190131534 A 11/2019

OTHER PUBLICATIONS

"International Search Report and Written Opinion Issued in PCT Application No. PCT/US23/010638", Mailed Date: Mar. 1, 29, 2023, 14 Pages. (MS# 411153-WO-PCT).

* cited by examiner

*Primary Examiner* — Phirin Sam
(74) *Attorney, Agent, or Firm* — Workman Nydegger

(57) ABSTRACT

A computing system configured to determine a time, a frequency, or a volume that time-critical data are to arrive and generate an uplink scheduling request based on the determined time, frequency, or volume. The uplink scheduling request is then sent to a base station, requesting an uplink grant. The computing system then receives the uplink grant from the base station over the radio interface. The uplink grant contains scheduling information associated with transmission of the time-critical data. In response to arrival of the time-critical data, the computing system then transmits the time-critical data over the radio interface based on the uplink grant with no or little latency.

20 Claims, 12 Drawing Sheets

SCHEDULING TIME-CRITICAL DATA ON A RADIO INTERFACE

BACKGROUND

Mobile networks allow user equipment, such as mobile phones, to communicate with other devices. Generally, the user equipment is configured to communicate with a nearby base station, which in turn passes the communication to a core network. The core network then passes the communication to a data network.

During the past few decades, the speed of mobile networks keeps improving. For example, the fifth-generation (5G) mobile network (also referred to as 5G New Radio (NR)) is capable of delivering up to 20 Gigabits-per-second peak data rates and 100+ Megabits-per-second average data rates. As such, many data-intensive applications (which could not have functioned properly over older generations' mobile networks) now can be used over 5G mobile networks.

However, it is still challenging for existing mobile networks to serve some applications that require certain data transmission (especially certain uplink data transmission) to be performed in near real time. An uplink data transmission is the transmission of data from user equipment to a base station. This challenge is generally caused by the difficulties of allocating limited resources to a large number of devices. For example, in a mobile network, to prevent multiple devices from communicating simultaneously, when a user device needs to send data to a base station, it is often required to send a scheduling request. Receiving the scheduling request, the base station allocates a time for the user equipment to transmit its data, and sends an uplink grant to the user equipment. Only after the user equipment receives the uplink grant, it can then transmit its data at the allocated time. The steps of sending the scheduling request and receiving the scheduling grant take extra time. Thus, it is challenging for any mobile network to eliminate or significantly reduce latency for uplink data transmission.

This challenge causes the user experience of some applications to suffer. For example, in a gaming network environment, a user's operation of a control stick, or a user's motion of a head-mounted device needs to be transmitted to a server in near real time, such that the server can update the display of the next scene for the user in near real time. Delayed transmission of such time-critical data would affect the user's experience significantly.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a computing system (such as, but not limited to a mobile phone, a head-mounted device) configured to schedule time-critical data over a radio interface (such as, but not limited to, a 5G new radio interface). Such a computing system is also referred to as user equipment or UE.

The computing system is configured to determine a time, a frequency, and/or a volume (also referred to as a first time, a first frequency, and/or a first volume) that the time-critical data are to arrive, and generate a scheduling request based on the time, the frequency, and/or the volume of the time-critical data. The computing system then sends the scheduling request to a base station (such as, but not limited to, a logical 5g radio node or gNB). The scheduling request is configured to request an uplink grant from the base station. The uplink grant contains scheduling information associated with the transmission of the time-critical data. After receiving the uplink grant, in response to an arrival of the time-critical data, the computing system can then transmit the time-critical data over the radio interface based on the uplink grant with no or little latency.

In some embodiments, the scheduling request is a configured scheduling request, and the uplink grant is a configured uplink grant, containing data transmission periodicity set based on the time, the frequency, and/or the volume of the time-critical data.

Alternatively, the scheduling request is a dynamic scheduling request, and the uplink grant is a dynamic uplink grant. In such an embodiment, generating the scheduling request includes generating and storing dummy data in a transmission buffer prior to the time when the time-critical data are to arrive, and generating a buffer status report and the dynamic scheduling request. The dummy data is kept in the transmission buffer until the arrival of the time-critical data. In response to the arrival of the time-critical data, the dummy data and the time-critical data are both sent to the base station based on the dynamic uplink grant.

In some embodiments, the computing system is further configured to determine whether there is ongoing transmission of non-time-critical data between the computing system and the base station. The scheduling request is generated in response to determining that there is no ongoing transmission of non-time-critical data.

In some embodiments, in response to determining that there is ongoing transmission of non-time-critical data, the computing system is further configured to send a service request to the base station to establish a new user plane. The scheduling request is generated after the new user plane is established to prioritize transmission of the time-critical data over the non-time-critical data.

In some embodiments, the computing system is further configured to determine a second time, a second frequency, and/or a second volume that the non-time-critical data are to arrive. The scheduling request is a configured scheduling request containing data transmission periodicity set based on both (1) the first time, the first frequency, and/or the first volume of the time-critical data, and (2) the second time, the second frequency, and/or the second volume of the non-time-critical data. In some embodiments, the computing system is configured to transmit the time-critical data before the non-time-critical data in each transmission period.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1:
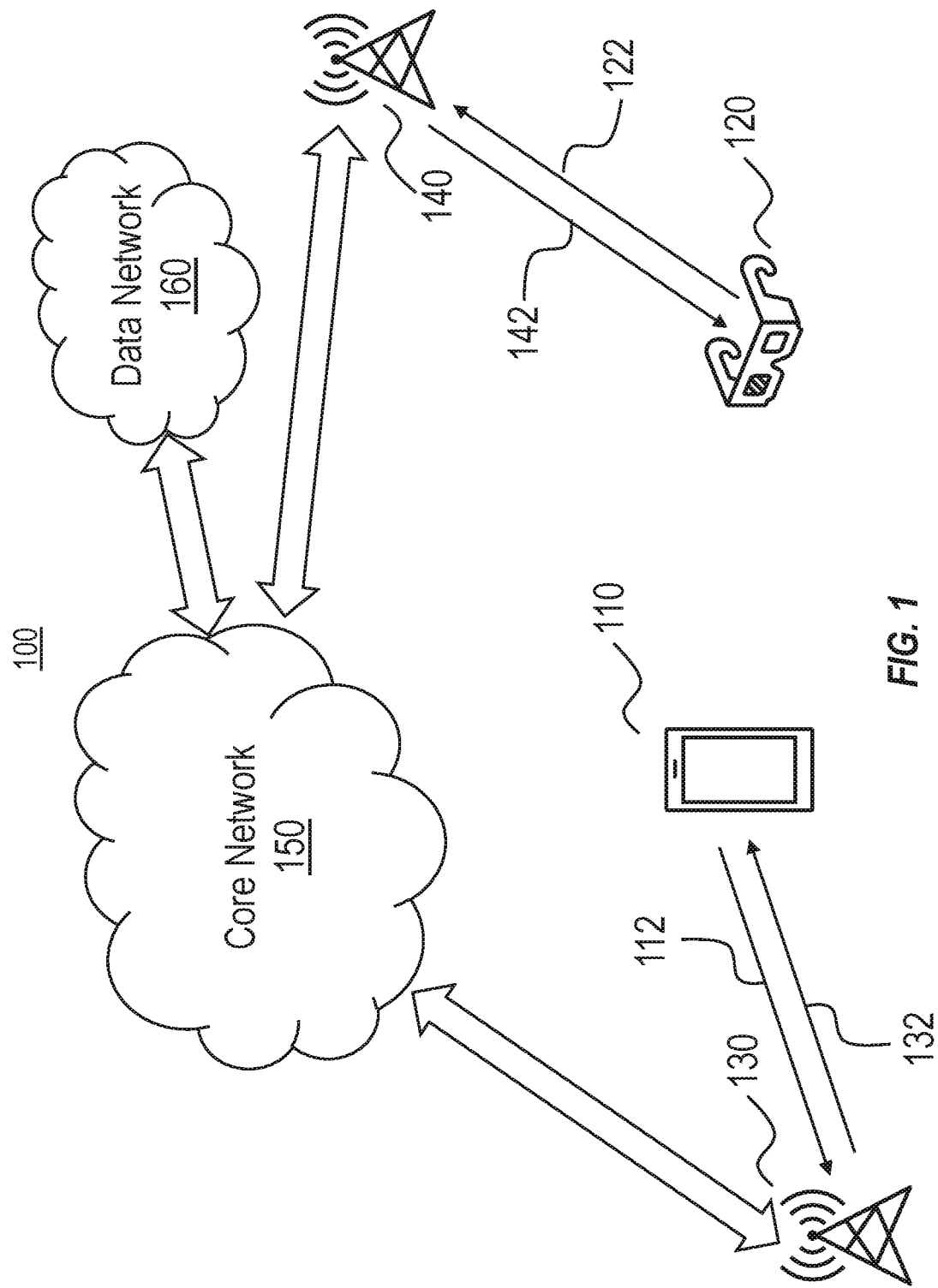
FIG. 1 illustrates an example broadband network environment in which principles described herein may be implemented.

Some traffic loads are time-critical from a latency perspective. For example, a head-mounted display needs to pass on information related to a wearer's movement, and such information is time-critical. These time-critical traffic loads may experience delays based on the schedule of uplink resource assignment. For example, from the time the application has time-critical data to send, the data is sent to the user equipment (UE) modem, which then sends a scheduling request and fills up the buffer status report (BSR). Once the dynamic uplink grant is received, the UE modem starts sending the data. This may take up to multiple time slots, and therefore increase the latency of the data to be scheduled to send to a base station, such as (but not limited to) a 3GPP 5G Next Generation base station (also referred to as gNB). As another example, when the application has time-critical data to send for a specific traffic stream while ongoing transmission is happening for a non-time-critical traffic stream, the UE modem may have to wait for the ongoing transmission of data to complete before it starts serving the request to transmit time-critical data.

The principles described herein solve the above problem by determining (or predicting) a time, a frequency, and/or a volume of time-critical data, and requesting an uplink grant based on the determined (or predicted) time, frequency, and/or volume of the time-critical data.

The example embodiments described herein are related to a computing system (such as, but not limited to, a mobile phone, a head-mounted device) configured to schedule time-critical data over a radio interface (such as, but not limited to, a 5G new radio interface) based on a time, a frequency, and/or a volume of time-critical data. Such a computing system is also referred to as user equipment or UE.

The computing system is configured to determine a time, a frequency, and/or a volume (also referred to as a first time, a first frequency, and/or a first volume) that the time-critical data are to arrive, and generate a scheduling request based on the time, the frequency, and/or the volume of the time-critical data. The computing system then sends the scheduling request to a base station (such as, but not limited to, a logical 5g radio node or gNB). The scheduling request is configured to request an uplink grant from the base station. The uplink grant contains scheduling information associated with the transmission of the time-critical data. After receiving the uplink grant, in response to an arrival of the time-critical data, the computing system can then transmit the time-critical data over the radio interface based on the uplink grant with no or little latency.

In some embodiments, the scheduling request is a configured scheduling request, and the uplink grant is a configured uplink grant, containing data transmission periodicity set based on the time, the frequency, and/or the volume of the time-critical data.

Alternatively, the scheduling request is a dynamic scheduling request, and the uplink grant is a dynamic uplink grant. In such an embodiment, generating the scheduling request includes generating and storing dummy data in a transmission buffer prior to the time when the time-critical data are to arrive, and generating a buffer status report and the dynamic scheduling request. The dummy data is kept in the transmission buffer until the arrival of the time-critical data. In response to the arrival of the time-critical data, the dummy data and the time-critical data are both sent to the base station based on the dynamic uplink grant.

In some embodiments, the computing system is further configured to determine whether there is ongoing transmission of non-time-critical data between the computing system and the base station. The scheduling request is generated in response to determining that there is no ongoing transmission of non-time-critical data.

In some embodiments, in response to determining that there is ongoing transmission of non-time-critical data, the computing system is further configured to send a service request to the base station to establish a new user plane. The scheduling request is generated after the new user plane is established to prioritize transmission of the time-critical data over the non-time-critical data.

In some embodiments, the computing system is further configured to determine a second time, a second frequency, and/or a second volume that the non-time-critical data are to arrive. The scheduling request is a configured scheduling request containing data transmission periodicity set based on both (1) the first time, the first frequency, and/or the first volume of the time-critical data, and (2) the second time, the second frequency, and/or the second volume of the non-time-critical data. In some embodiments, the computing system is configured to transmit the time-critical data before the non-time-critical data in each transmission period.

FIG. 1 illustrates an example broadband network environment 100, in which the principles described herein may be implemented. As illustrated in FIG. 1, the broadband network environment 100 includes a plurality of user equipment 110, 120, and a plurality of base stations 130, 140. The user equipment includes (but is not limited to) a mobile phone 110 and a head-mounted device 120. Each base station 130, 140 is configured to relay the communications over the radio interface to a core network 150. The core network 150 may be (but not is limited to) a 5G NR core network. The core network 150 is then configured to communicate with a data network 160, such as the Internet.

Notably, the core network 150 may include many different entities and devices configured to perform various functions, such as (but not limited to) mobility management function (AMF), session management function (SMF), authentication server function (AUSF), network slice selection function (NSSF), network repository function (NRF), policy control function (PCF), network data analytic function (NWDAF), unified data management (UDM), and edge computing application function (AF). Similarly, the data network 160 may also include many different entities and devices configured to perform various functions, which will not be further discussed.

As illustrated in FIG. 1, each user equipment 110, 120 is configured to communicate with a nearby base station 130, 140 over a radio interface. For example, as illustrated, the mobile phone 110 is configured to communicate with base station 130, and the head-mounted device 120 is configured to communicate with base station 140. The communication 112, 122 from user equipment 110, 120 to base station 130, 140 is uplink (UL) communication, and the communication 132, 142 from base station 130, 140 to user equipment 110, 120 is downlink (DL) communication.

Figure 2:
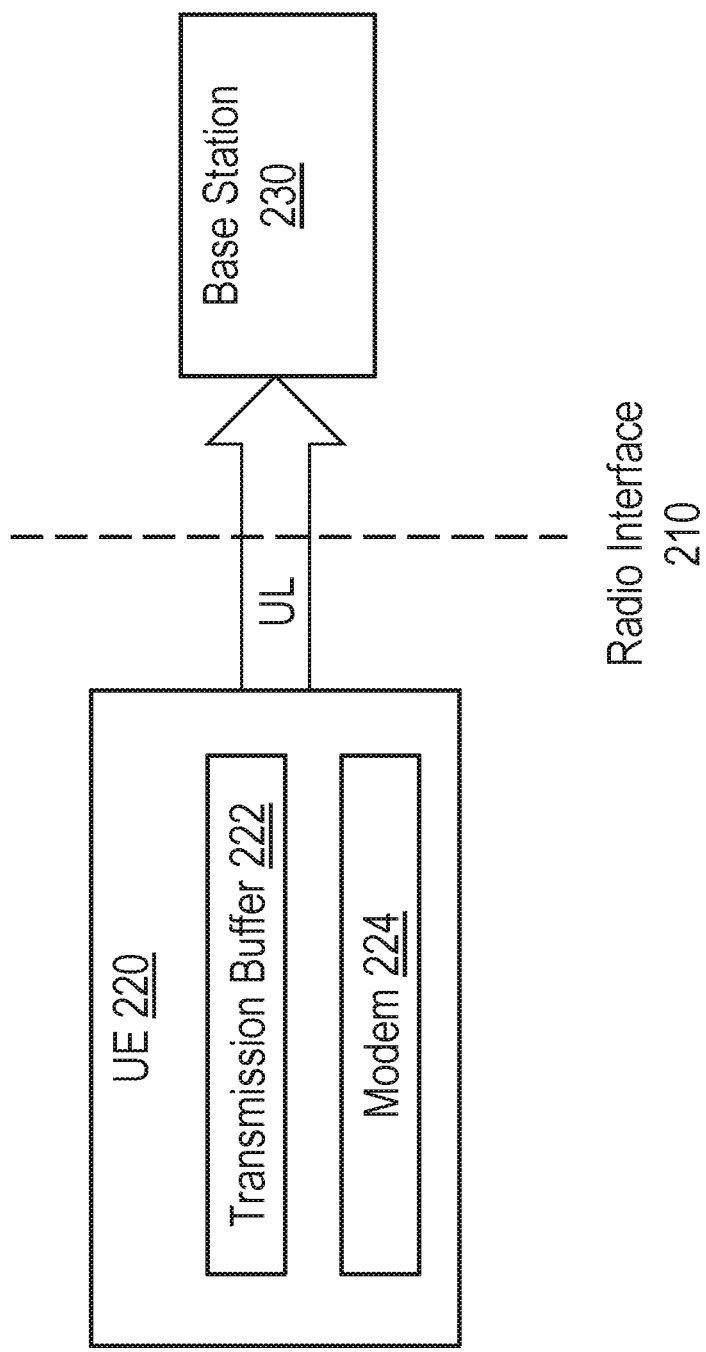
FIG. 2 illustrates an example radio interface, between which a user equipment device and a base station are configured to communicate with each other.

FIG. 2 further illustrates an example radio interface 210 over which a UE 220 (which corresponds to the UE 110, 120 of FIG. 1) and a base station 230 (which corresponds to the base station 130, 140 of FIG. 1) are configured to communicate with each other. The UE 220 includes a transmission buffer 222 configured to temporarily store UL data. The UE 220 also includes a wireless modem 224 configured to transmit the UL data stored in the transmission buffer 222 to the base station 230 over the radio interface 210. In some embodiments, when UL data arrives at the transmission buffer 222, a buffer status report (BSR) is generated. In response to generating a BSR, the wireless modem 224 is configured to generate and send a scheduling request to the base station 230, causing the base station 230 to allocate resources to the UL transmission. In response to allocating the resources, the base station 230 then sends a UL grant to the wireless modem 224. The UL grant indicates the resources allocated to the UL data, causing the wireless modem 224 to transmit the UL data based on the UL grant.

Figure 3:
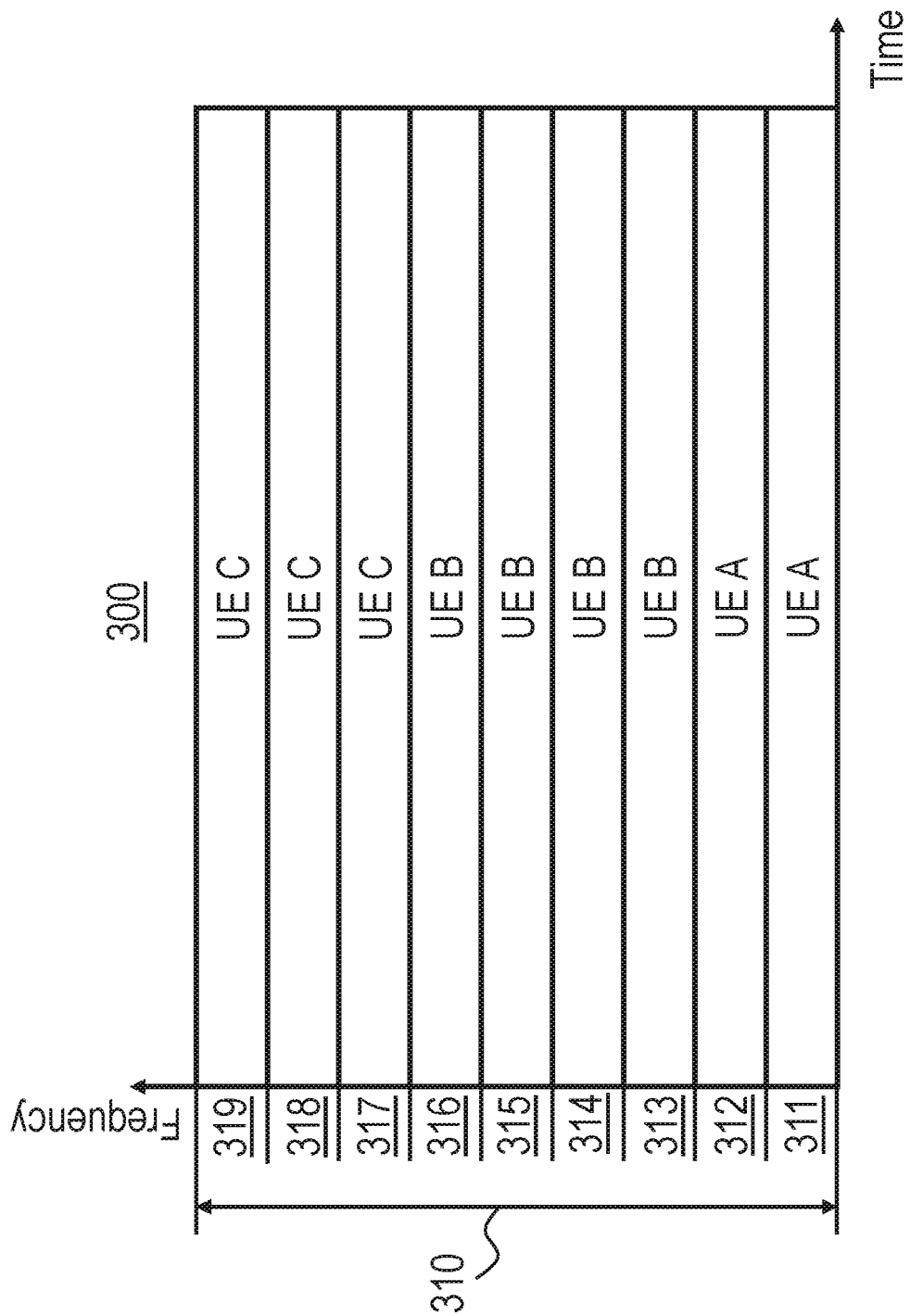
FIG. 3 illustrates a chart of an example frequency allocation for a plurality of user equipment devices.

The resources that can be allocated to DL and UL transmission includes (but are not limited to) frequency bandwidths and time slots. FIG. 3 illustrates a chart 300 of an example frequency allocation. Chart 300 includes a horizontal axis and a vertical axis. The horizontal axis represents time, and the vertical axis represents frequency. A carrier frequency band 310 (also referred to as carrier frequency) is divided into a plurality of subcarrier frequency bands 311-319 (also referred to as subcarriers). Each user equipment may be allocated with one or more subcarriers 311-319. As illustrated, user equipment A is allocated with subcarriers 311-312, user equipment B is allocated with subcarriers 331-316, and user equipment C is allocated with subcarriers 317-319.

Figure 4:
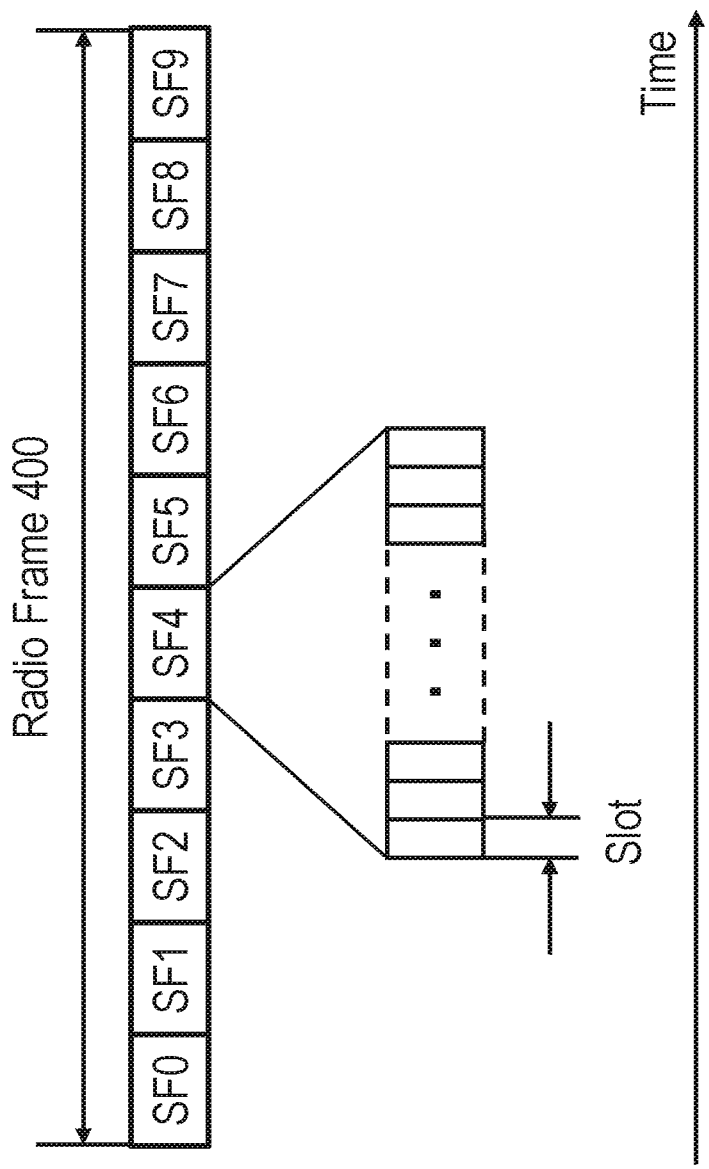
FIG. 4 illustrates an example radio frame, which is further divided into a plurality of subframes and/or time slots.

Similarly, time is also divided into subsections called radio frames. FIG. 4 illustrates an example radio frame 400, which is further divided into a plurality of subframes SF0-SF9. In some embodiments, each radio frame is 10 ms, and each subframe is 1 ms. Each subframe is further divided into a plurality of time slots. In some embodiments, each slot is further divided into a plurality of sub-slots. One or more symbols can be transmitted over each time slot. For example, in some embodiments, each slot is configured to transmit 14 symbols.

Some of the slots may be allocated to transmit downlink (DL) data, and some of the slots may be allocated to transmit uplink (UL) data. In some embodiments, the DL/UL time slots are allocated dynamically. For example, referring back to FIG. 2, during a dynamic scheduling process, when UL data arrives at transmission buffer 222, the UE 220 generates a BSR and a scheduling request. The scheduling request is then sent to the base station 230 over the radio interface 210. In response to receiving the scheduling request, the base station 230 sends a UL grant, which allocates a time for the UE 220 to transmit its UL data. In response to receiving the UL grant, the UE 220 then transmits the UL data stored in the transmission buffer 222 to the base station 230 at the allocated time.

Figure 5:
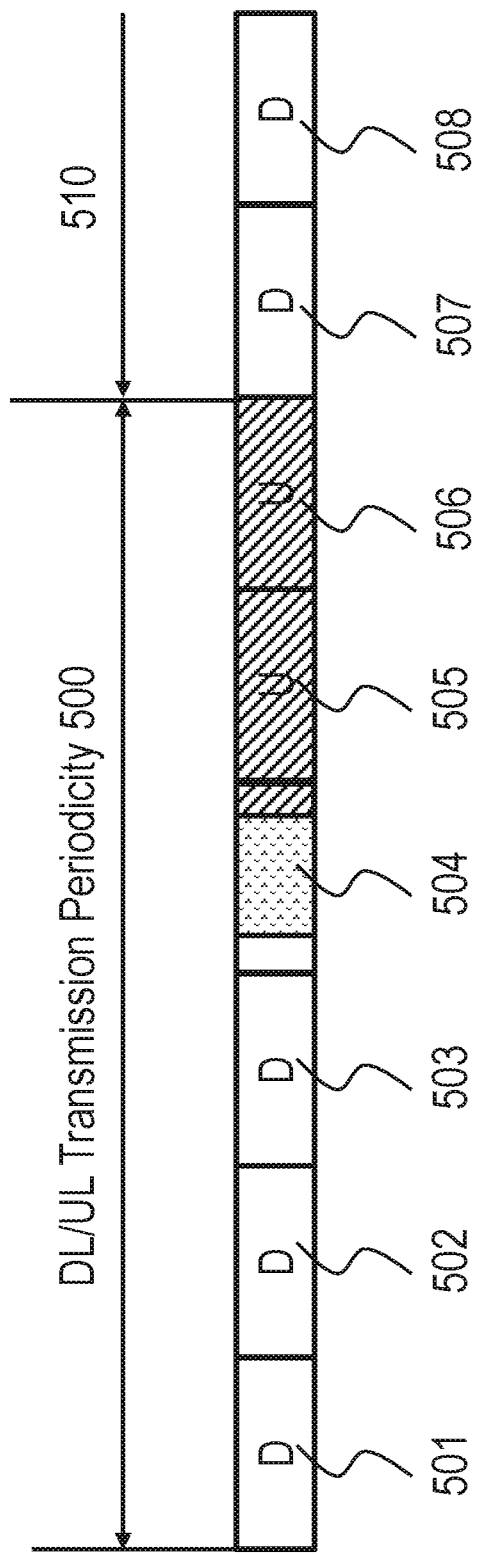
FIG. 5 illustrates an example of a downlink/uplink transmission periodicity that may be configured by a user equipment device.

In some embodiments, the DL/UL transmission time can be configured by UE. For example, in some embodiments, the UE is allowed to configure a DL/UL transmission periodicity, in which a first number of time slots are allocated for DL data, and a second number of the time slots are allocated for UL data. FIG. 5 illustrates an example of a DL/UL transmission periodicity 500, including six time slots 501-506. Among the six time slots 501-506 in the DL/UL transmission periodicity 500, three time slots 501-503 are allocated for downlink transmission, and two slots 505-506 are allocated for uplink transmission. A transitional slot 504 is between the DL and UL transmission slots in the transmission periodicity 500, allowing some space between the DL and UL transmissions in the transmission periodicity 500. The same DL/UL transmission periodicity 500 repeats. For example, as illustrated in FIG. 5, after the last time slot 506 in the DL/UL transmission periodicity 500, a next DL/UL transmission periodicity 510 starts. The next DL/UL transmission periodicity 510 has the same DL/UL time-slot patterns as the previous DL/UL transmission periodicity 500. For example, the first two time slots 507 and 508 in the next DL.UL transmission periodicity 510 are both downlink time slots, similar to those in the previous DL/UL transmission periodicity 500.

As discussed above, in some applications, certain data generated by UE is time-critical. For example, in a gaming application, when the UE is a head-mounted device configured to detect a real-time position of a user, such real-time position of the user is time-critical, because the application uses the position data to generate a next scene of the game, and delayed transmission of such data would significantly affect the user's experience. Existing UE often uses dynamic scheduling to schedule time-critical data. In dynamic scheduling, when time-critical data arrives, the data is sent to the wireless modem, which then sends a scheduling request and generates a BSR. Receiving the scheduling request, the base station generates a UL dynamic grant and sends the UL dynamic grant to the UE. After a UL dynamic grant is received, the wireless modem then starts transmitting the time-critical data. It may take up multiple time slots from a first time, when the time-critical data arrives, to a second time, when the time-critical data is transmitted; therefore, undesired latency of the UL transmission may occur.

The principles described herein solve the above-described problem by determining (or predicting) a time, a frequency, and/or a volume of time-critical data, and requesting an uplink grant based on the determined (or predicted) time, frequency, and/or volume of the time-critical data. As such, when the time-critical data arrives, the data is ready to be transmitted based on the previously obtained uplink grant.

In some embodiments, when there is no ongoing transmission of non-time-critical data, the UE can schedule dummy data at a time prior to the arrival of time-critical data, and not empty the transmission buffer, so that the uplink grant is maintained from the base station until the time-critical data arrives. As such, the scheduling delay caused by dynamic scheduling is reduced or eliminated. Alternatively, the UE can request a configured scheduling grant. The configured scheduling grant has a periodicity that matches the frequency and volume of time-critical data traffic.

In some embodiments, when there is ongoing transmission of non-time-critical data, the UE sends a separate service request, and establishes a new user plane for the time-critical traffic flow, prioritizing the transmission of time-critical data than the non-time-critical data. For example, in the new user plane, the UE can request a configured scheduling grant based on the time, frequency, and/or volume of the time-critical data.

Figure 6A:
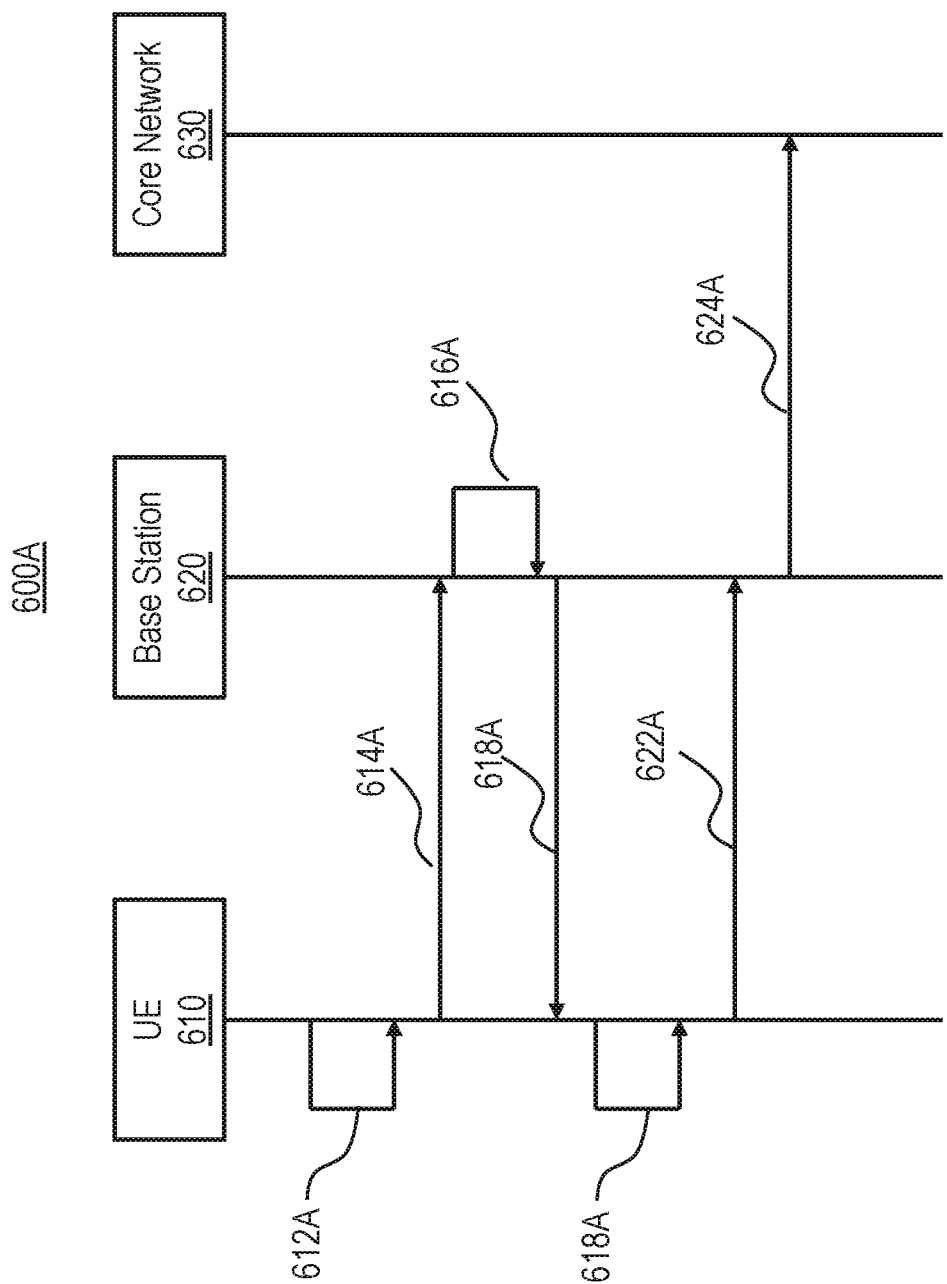
FIGS. 6A-6C illustrate examples of communication patterns among user equipment, a base station, and a core network.

FIG. 6A illustrates an example communication pattern 600A among a UE 610 (which corresponds to UE 110, 120 of FIG. 1), a base station 620 (which corresponds to base station 130, 140 of FIG. 1), and a core network 630 (which corresponds to core network 160 of FIG. 1). In response to determining a time, a frequency, and/or a volume of time-critical data that are to arrive, the UE 610 generates dummy data prior to the determined time when the time-critical data is to arrive. The dummy data is then stored at a transmission buffer. In response to storing the dummy data in the transmission buffer, a BSR and a UL scheduling request are generated (which is represented by arrow 612A). The UE 610 then sends the scheduling request to the base station 620 (which is represented by arrow 614A). Receiving the scheduling request, the base station 620 allocates a time for the UL transmission and generates a UL dynamic grant (which is represented by arrow 616A). The base station 620 then sends the UL dynamic grant to the UE (which is represented by arrow 618A). Receiving the UL dynamic grant, the UE 610 keeps the dummy data in the transmission buffer until the time-critical data arrives (which is represented by arrow 622A). In response to receiving the time-critical data, the UE 610 transmits both the dummy data and the time-critical data to the base station 620 based on the UL dynamic grant (which is represented by arrow 624A). The base station 620, in turn, passes the received UL data to the w network 630.

Figure 6B:
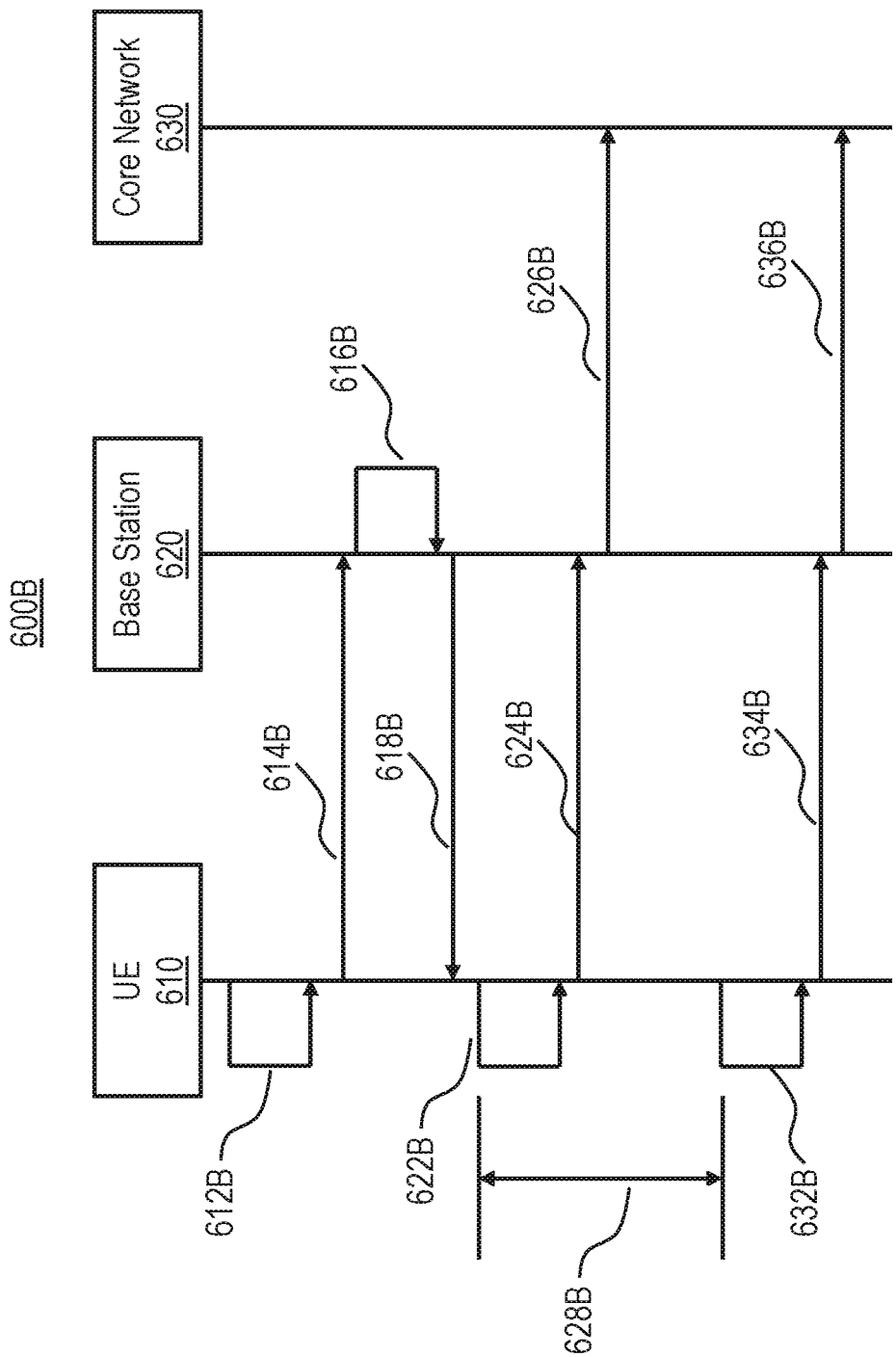

FIG. 6B illustrates another example communication pattern 600B among the UE 610, base station 620, and core network 630. In communication pattern 600B, the UE 610 generates a configured scheduling request (which is represented by arrow 612B) and sends the configured scheduling request to the base station 620 (represented by arrow 614B). The configured scheduling request is generated based on the time, frequency, and volume of the time-critical data. For example, as illustrated in FIG. 5, the configured scheduling request includes a DL/UL transmission periodicity, having a first number of DL transmission time slots and a second number of UL transmission time slots. The DL/UL transmission periodicity can be set to correspond to the frequency of the time-critical data. The second number of UL transmission time slots can be set to correspond to the volume of the time-critical data. In response to receiving the configured scheduling request, the base station 620 allocates the requested DL/UL transmission periodicity to the UE 610 and respective DL/UL time slots, and generates a configured grant (which is represented by arrow 616B). The configured grant is then sent to the UE 610 (which is represented by arrow 618B).

In response to receiving the configured grant, the UE 610 is then able to transmit time-critical data based on the configured grant. For example, as illustrated in FIG. 6B, arrows 622B and 632B represent the arrival of time-critical data. The time period 628B between the two sets of time-critical data is the DL/UL transmission periodicity set in the configured grant. Because the configured grant is generated based on the time, frequency, and volume of the time-critical data, the time-critical data is able to be transmitted to the base station 620 right after their arrival (represented by arrows 624B, 634B). After receiving the time-critical data, the base station 620, in turn, transmits the time-critical data to the core network 630 (represented by arrows 626B, 636B).

Figure 6C:
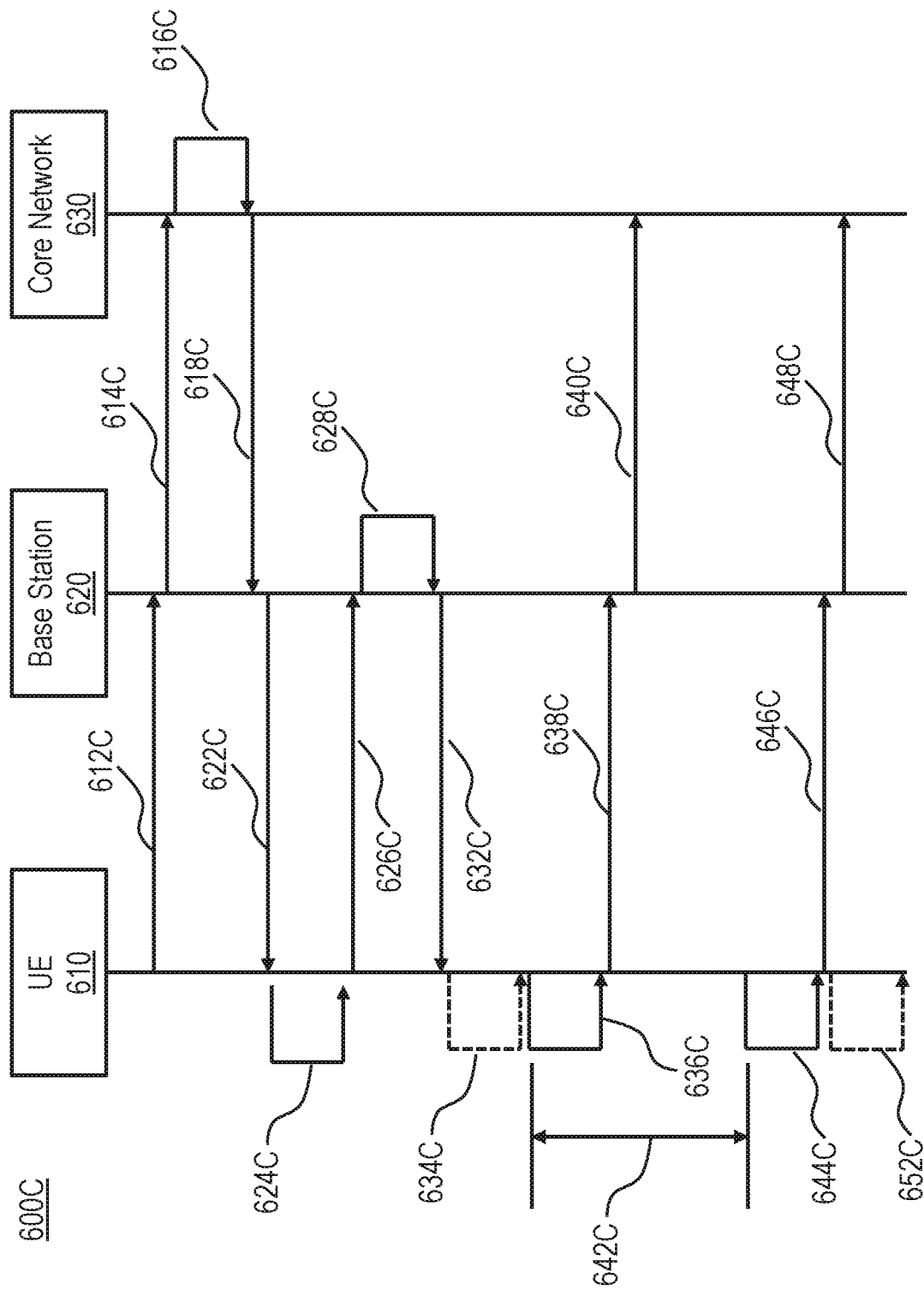

The above-discussed communication patterns 600A, 600B are likely implemented when there is no ongoing data transmission between the UE 610 and the base station 620. FIG. 6C illustrates another communication pattern 600C that may be implemented when there is ongoing data transmission between the UE 610 and the base station 620. When there is ongoing data transmission between the UE 610 and the base station 620, the UE 610 first sends a service request to the base station 620 (which is represented by arrow 612C). The service request procedure is used by UE or by the network to request the establishment of a secure connection to a mobility management function (AMF), which is a function of the core network 630. The service request procedure is also used to activate a user plane connection for an established packet data network protocol data unit (PDU) session.

Receiving the service request, the base station 620 then passes the service request to the core network 630 (which is represented by arrow 614C). Receiving the service request, the core network 630 grants the service request (which is represented by arrow 616C). Note, granting the service request may involve multiple entities and functions in the core network 630. For example, an authentication server function (AUSF) may be required to authenticate the UE 610, and in response to successful authentication of the UE, a secure connection may then be established with the AMF. The entity core network 630 represents all these entities that are involved in the receiving and granting of the service request. Additional details related to service requests and grants will not be further discussed.

After the service request is granted, the core network 630 sends the service grant to the base station 620 (which is represented by arrow 618C). The base station 620 then passes the service grant to the UE 610 (which is represented by arrow 622C). As such, a new user plane is established. After the new user plane is established, the UE 610 then generates a configure scheduling grant (represented by arrow 624C), prioritizing time-critical data over non-time-critical data. In some embodiments, the UE 610 is configured to determine a first time, a first frequency, and/or a first volume of time-critical data, and a second time, a second frequency, and/or a second volume of non-time-critical data. The configured scheduling is based on both (1) the first time, the first frequency, and/or the first volume, and (2) the second time, the second frequency, and/or the second volume.

For example, in some embodiments, the UE 610 determines a DL/UL transmission periodicity based on the first frequency of the time-critical data. The UE 610 also determines a first number of DL slots and a second number of UL slots in each DL/UL transmission periodicity. The second number of UL slots is set based on both the first time and first volume of the time-critical data, and the second time and the second volume of the non-time-critical data. The UE 610 then generates a configured scheduling based on the determined DL/UL transmission periodicity, the first number of DL slots, and a second number of UL slots. The configured scheduling request is then sent to the base station 620 (represented by arrow 626C). In response to receiving the configured scheduling request, the base station 620 allocates the requested DL/UL transmission periodicity and generates a configured grant (represented by arrow 628C). The configured grant is then sent to the UE 610 (represented by arrow 632C).

As illustrated, arrows 634C, 652C in dotted line represent the arrival of non-time-critical data, and arrows 636C, 644C in solid line represent the arrival of time-critical data. As discussed above, the configured scheduling includes a DL/UL periodicity 642C based on the time and frequency of the time-critical data. In response to the arrival of time-critical data (represented by arrow 636C), the UE 610 sends both time-critical data and non-time-critical data to the base station 620 (which is represented by arrow 636C). The base station 620, in turn, passes the received data to the core network 630 (represented by arrow 640C).

As illustrated in FIG. 6C, when time-critical data arrives (represented by arrow 644C), but non-time-critical data has yet to arrive, the UE 610 does not have to wait for the non-time-critical data. Instead, the UE 610 sends the time-critical data as soon as possible (which is represented by arrow 646C). Again, the base station 620 then passes the received data to the core network 630 (which is represented by arrow 648C).

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
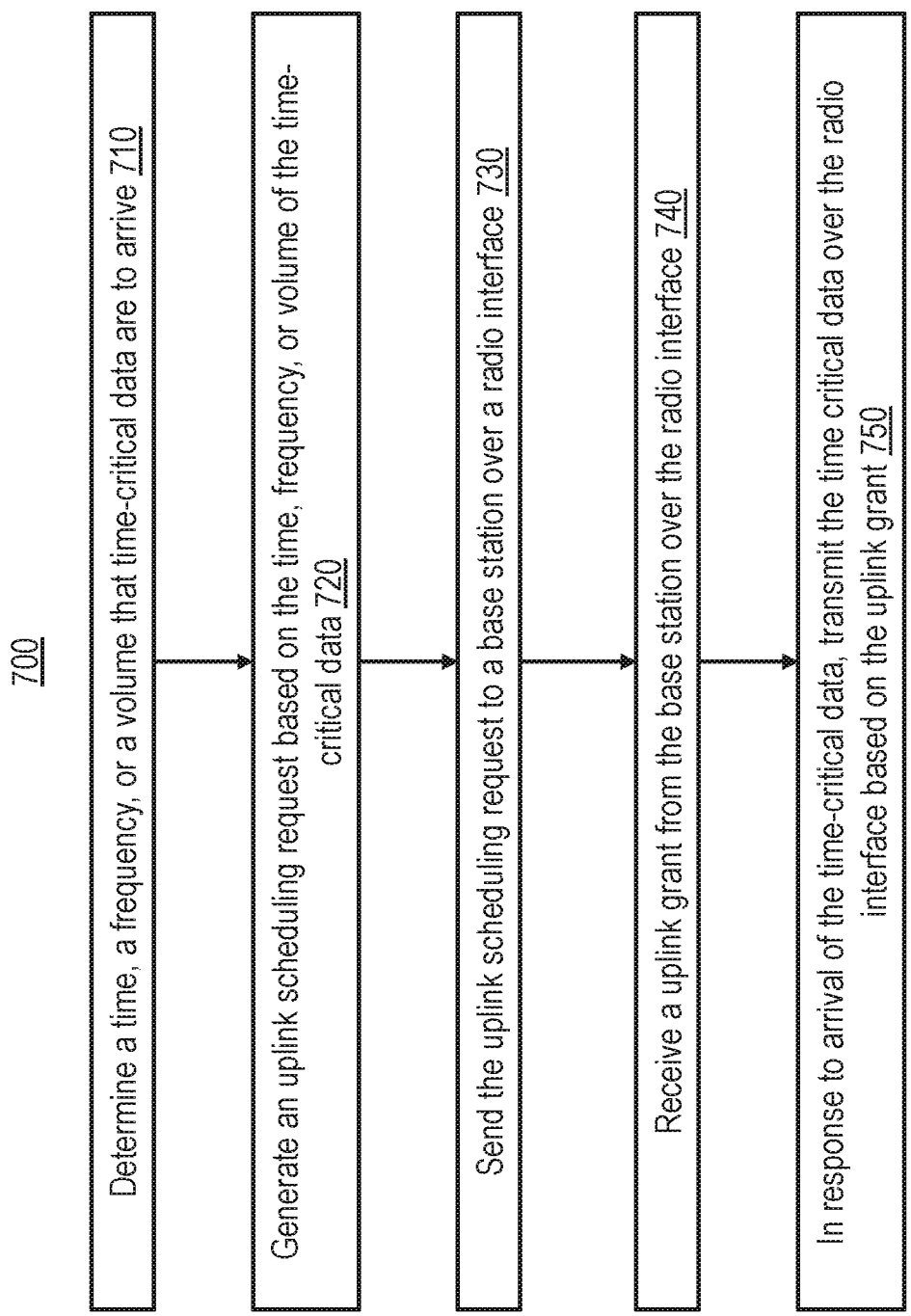
FIG. 7 illustrates a flowchart of an example method for scheduling uplink time-critical data over a radio interface.

FIG. 7 illustrates a flowchart of an example method 700 for scheduling uplink time-critical data over a radio interface. The method 700 may be performed by UE 110, 120 of FIG. 1, and/or 220 of FIG. 2. The method 700 includes determining a time, a frequency, and/or a volume that time-critical data are to arrive (act 710) and generating an uplink scheduling request based on the time, frequency, or volume of the time-critical data (act 720). The uplink scheduling request is then sent to a base station (act 730), causing the base station to allocate time to the uplink data transmission and generate an uplink grant based on the allocated time. The uplink grant is then received by the UE over the radio interface (act 740). In response to the arrival of the time-critical data, the time-critical data is then transmitted to the base station over the radio interface based on the uplink grant (act 750).

In some embodiments, the uplink scheduling request is a configured scheduling request, and the uplink grant is a configured uplink grant. The configured scheduling request contains a data transmission periodicity, a first number of DL slots and/or a second number of UL slots in each data transmission periodicity.

Figure 8:
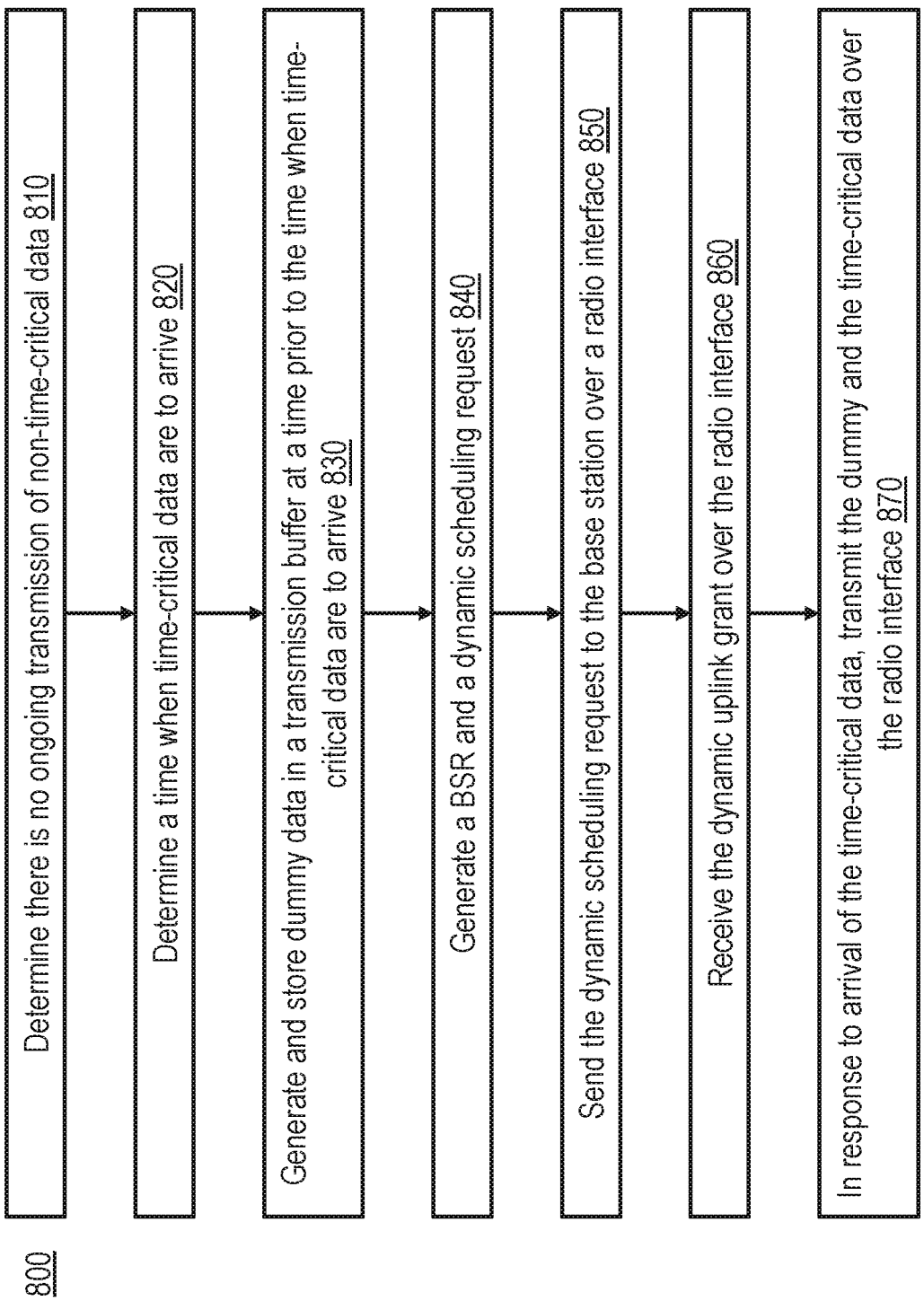
FIG. 8 illustrates a flowchart of an example method for dynamically scheduling uplink requests when there is no ongoing transmission of non-time-critical data.

Alternatively, the uplink scheduling request is a dynamic scheduling request, and the uplink grant is a dynamic uplink grant. FIG. 8 illustrates a flowchart of an example method 800 for dynamically scheduling time-critical data over a radio interface. The method 800 includes determining that there is no ongoing transmission of non-time-critical data (act 810) and determining a time when time-critical data are to arrive (act 820). Dummy data is then generated and stored in a transmission buffer at a time prior to the time when time-critical data are to arrive (act 830). In response to storing the dummy data in the transmission buffer, a BSR and a dynamic scheduling request are generated (act 840). The dynamic scheduling request is then sent to the base station over a radio interface (act 850). After receiving the dynamic scheduling request, the base station allocates a time for the UE to perform uplink transmission, and sends a dynamic uplink grant to the UE. The dynamic uplink grant is then received by the UE over the radio interface (act 860). The UE keeps the dummy data in the transmission buffer until the time-critical data arrives. In response to the arrival of the time-critical data, the dummy data and the time-critical data are both transmitted to the base station over the radio interface (act 870).

Figure 9:
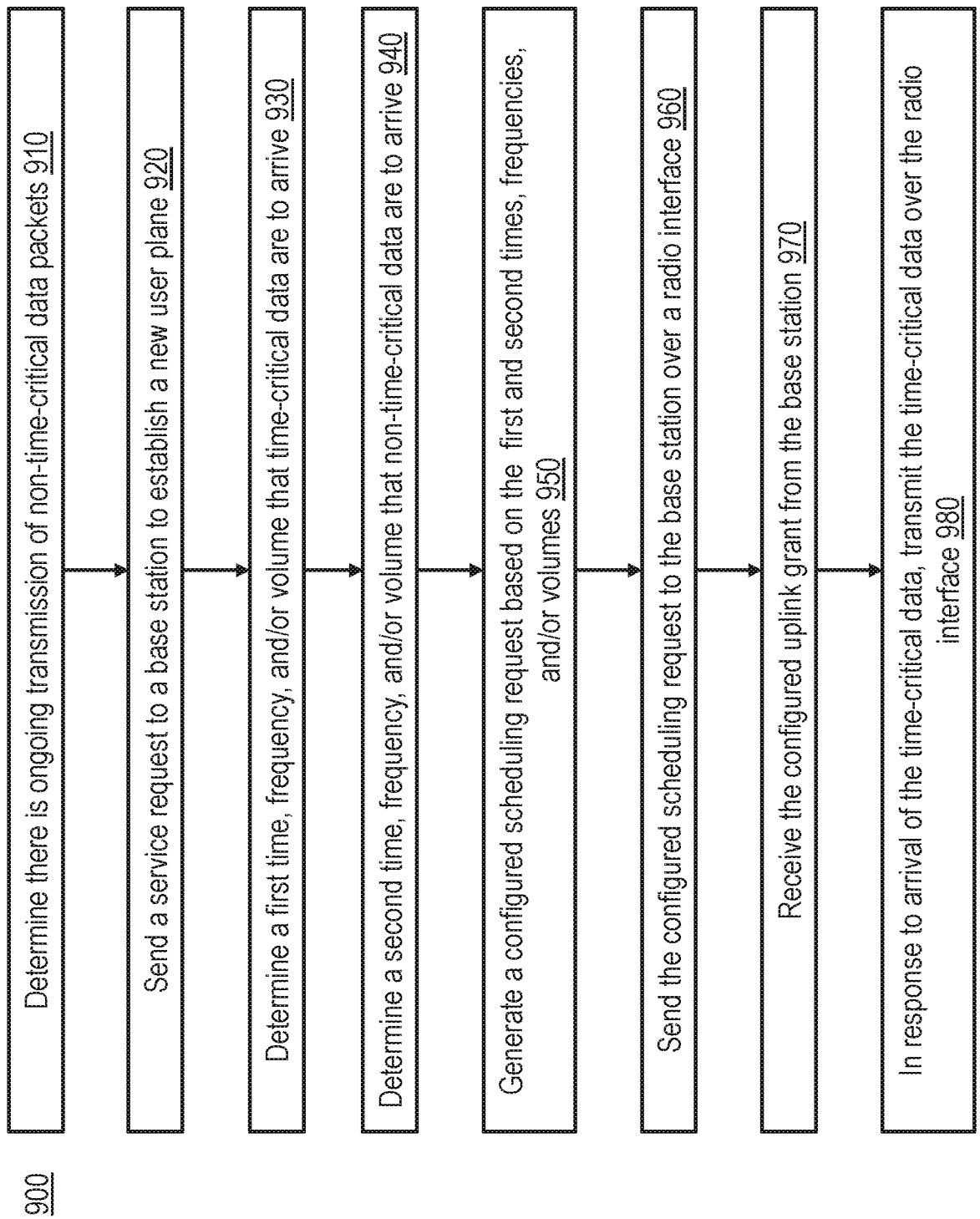
FIG. 9 illustrates a flowchart of an example method for configured scheduling uplink requests when there is ongoing transmission of non-time-critical data.

In some embodiments, there is ongoing transmission of non-time-critical data between a UE and a base station. In such a case, a service request is sent to the base station to establish a new user plane. FIG. 9 illustrates a flowchart of an example method 900 for scheduling time-critical data when there is ongoing transmission of non-time-critical data. The method 900 includes determining that there is ongoing transmission of non-time-critical data (act 910) and sending a service request to a base station to establish a new user interface (act 920). The method 900 also includes determining a first time, a first frequency, and/or a first volume that time-critical data are to arrive (act 930), and determining a second time, a second frequency, and/or a second volume that non-time-critical data are to arrive (act 940). A configured scheduling request is then generated based on (1) the first time, first frequency, and/or the first volume, and (2) the second time, the second frequency, and/or the second volume (act 950). The configured scheduling is then sent to the base station over a radio interface (act 960). After receiving the configured scheduling request, the base station grants the scheduling request and sends a configured uplink grant. After receiving the configured uplink grant (act 970), in response to the arrival of the time-critical data, the time-critical data is then transmitted to the base station based on the configured uplink grant over the radio interface (act 980).

Finally, because the principles described herein may be performed in the context of a computing system (for example, each of the UE 110, 120, base station 130, 140 is a computing system), some introductory discussion of a computing system will be described with respect to FIG. 10.

Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 10:
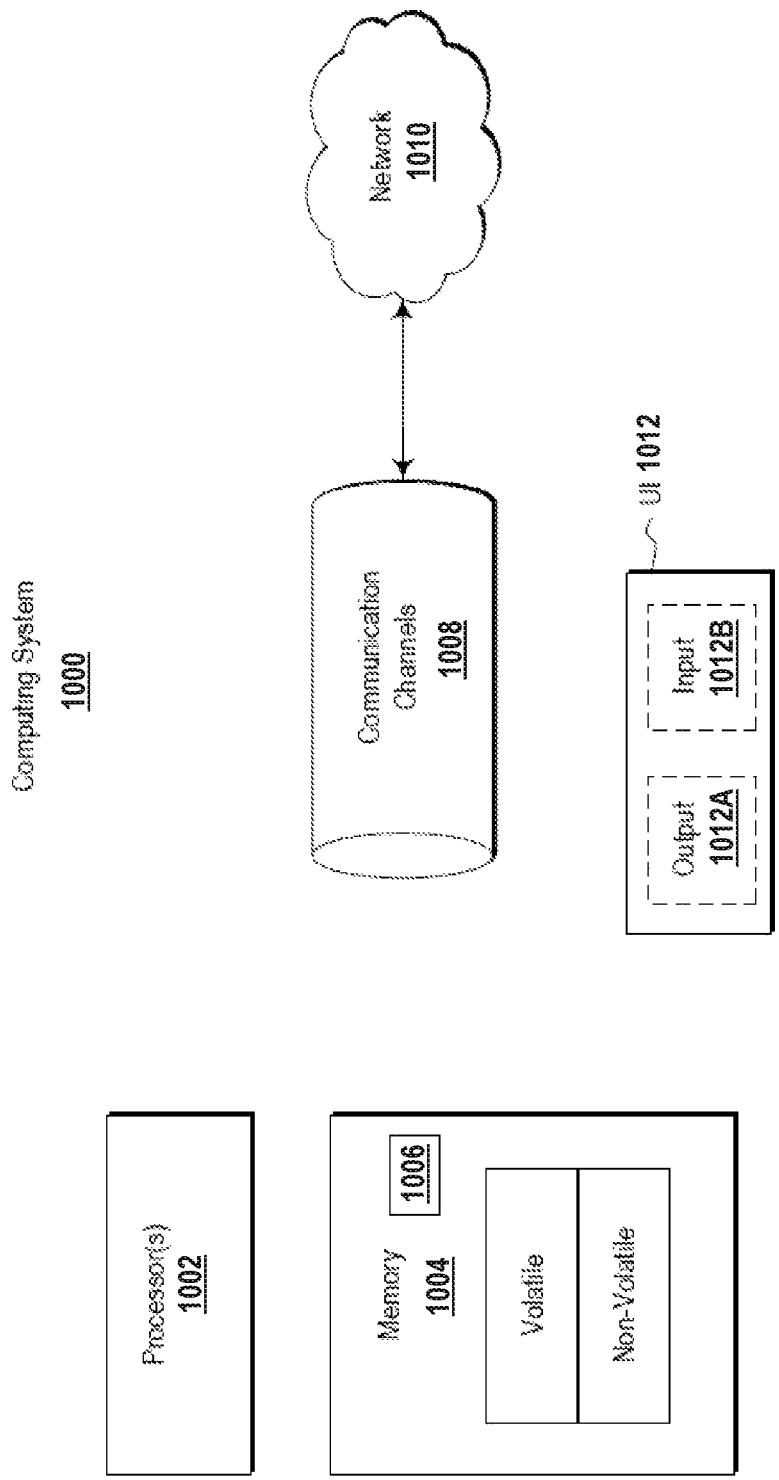
FIG. 10 illustrates an example computing system in which the principles described herein may be employed.

As illustrated in FIG. 10, in its most basic configuration, a computing system 1000 typically includes at least one hardware processing unit 1002 and memory 1004. The processing unit 1002 may include a general-purpose processor and may also include a field-programmable gate array (FPGA), an application-specific integrated circuit (ASIC), or any other specialized circuit. The memory 1004 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1000 also has thereon multiple structures often referred to as an "executable component". For instance, memory 1004 of the computing system 1000 is illustrated as including executable component 1006. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component."

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 1004 of the computing system 1000. Computing system 1000 may also contain communication channels 1008 that allow the computing system 1000 to communicate with other computing systems over, for example, network 1010.

While not all computing systems require a user interface, in some embodiments, the computing system 1000 includes a user interface system 1012 for use in interfacing with a user. The user interface system 1012 may include output mechanisms 1012A as well as input mechanisms 1012B. The principles described herein are not limited to the precise output mechanisms 1012A or input mechanisms 1012B as such will depend on the nature of the device. However, output mechanisms 1012A might include, for instance, speakers, displays, tactile output, holograms, and so forth. Examples of input mechanisms 1012B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmissions media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 1000 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 1002 and memory 1004, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable hardware devices having stored thereon computer-executable instructions that are structured such that, when executed by the one or more processors, cause the computing system to perform at least:
      determine a time, a frequency, or a volume that time-critical data are to arrive;
      generate a dynamic uplink scheduling request based on the time, the frequency, or the volume of the time-critical data, wherein generating the dynamic uplink scheduling request comprises:
         generating and storing dummy data in a transmission buffer prior to the time when the time-critical data are to arrive; and
         generating a buffer status report;
      send the dynamic uplink scheduling request to a base station over a radio interface, requesting a dynamic uplink grant from the base station;
      receive the dynamic uplink grant from the base station over the radio interface, the dynamic uplink grant containing scheduling information associated with transmission of the time-critical data;
      keeping the dummy data in the transmission buffer until the arrival of the time-critical data; and
      in response to arrival of the time-critical data, transmit the dummy data and the time-critical data over the radio interface to the base station based on the dynamic uplink grant.

2. The computing system of claim 1, wherein the radio interface is a 5G NR radio interface.

3. The computing system of claim 1, wherein the base station is a logical 5G radio node.

4. The computing system of claim 1, wherein the computing system comprises a head-mounted device or a hand controller configured to detect a real-time position of a user, and the time-critical data is related to the real-time position of the user.

5. The computing system of claim 1, wherein:
the computing system is further configured to determine whether there is ongoing transmission of non-time-critical data between the computing system and the base station; and
the dynamic uplink scheduling request is generated in response to determining that there is no ongoing transmission of non-time-critical data.

6. The computing system of claim 5, wherein:
in response to determining that there is ongoing transmission of non-time-critical data, the computing system is further configured to send a service request to the base station to establish a new user plane, and
the dynamic uplink scheduling request is generated after the new user plane is established to prioritize transmission of the time-critical data over the non-time-critical data.

7. The computing system of claim 6, wherein:
the time, the frequency, or the volume of the time-critical data is a first time, a first frequency, or a first volume, and
the computing system is further configured to:
determine a second time, a second frequency, or a second volume that the non-time-critical data are to arrive, and
generate a configured uplink scheduling request containing data transmission periodicity set based on both (1) the first time, the first frequency, or the first volume of the time-critical data, and (2) the second time, the second frequency, or the second volume of the non-time-critical data.

8. The computing system of claim 7, wherein the computing system is configured to transmit the time-critical data before the non-time-critical data in each transmission period.

9. A method implemented at a computing system for scheduling time-critical data on a radio interface, the method comprising:
determine a time, a frequency, or a volume that time-critical data are to arrive;
generate a dynamic uplink scheduling request based on the time, the frequency, or the volume of the time-critical data, wherein generating the dynamic uplink scheduling request comprises:
generating and storing dummy data in a transmission buffer prior to the time when the time-critical data are to arrive; and
generating a buffer status report;
send the dynamic uplink scheduling request to a base station over a radio interface, requesting a dynamic uplink grant from the base station;
receive the dynamic uplink grant from the base station over the radio interface, the dynamic uplink grant containing scheduling information associated with transmission of the time-critical data;
keeping the dummy data in the transmission buffer until the arrival of the time-critical data; and
in response to arrival of the time-critical data, transmit dummy data and the time-critical data over the radio interface to the base station based on the dynamic uplink grant.

10. The method of claim 9, wherein the radio interface is a 5G-NR radio interface.

11. The method of claim 9, wherein the base station is a logical 5G radio node.

12. The method of claim 9, wherein the computing system comprises a head-mounted device or a hand controller configured to detect a real-time position of a user, and the time-critical data is related to the real-time position of the user.

13. The method of claim 9, wherein:
the method further comprises determining whether there is ongoing transmission of non-time-critical data between the computing system and the base station; and
the dynamic uplink scheduling request is generated in response to determining that there is no ongoing transmission of non-time-critical data.

14. The method of claim 13, wherein:
the method further comprises in response to determining that there is ongoing transmission of non-time-critical data, sending a service request to the base station to establish a new user plane, and
the dynamic uplink scheduling request is generated after the new user plane is established to prioritize transmission of the time-critical data over the non-time-critical data.

15. The method of claim 14, wherein:
the time, the frequency, or the volume of the time-critical data is a first time, a first frequency, or a first volume, and
the computing system is further configured to:
determine a second time, a second frequency, or a second volume that the non-time-critical data are to arrive, and
generate a configured uplink scheduling request containing data transmission periodicity set based on both (1) the first time, the first frequency, or the first volume of the time-critical data, and (2) the second time, the second frequency, or the second volume of the non-time-critical data.

16. A computer program product comprising one or more hardware storage devices having stored thereon computer-executable instructions that are structured such that, when the computer-executable instructions are executed by one or more processors of a computing system, the computer-executable instructions configure the computing system to perform at least:
determine a time, a frequency, or a volume that time-critical data are to arrive;
generate a dynamic uplink scheduling request based on the time, the frequency, or the volume of the time-critical data, wherein generating the dynamic uplink scheduling request comprises:
generating and storing dummy data in a transmission buffer prior to the time when the time-critical data are to arrive; and
generating a buffer status report;
send the dynamic uplink scheduling request to a base station over a radio interface, requesting a dynamic uplink grant from the base station;
receive the dynamic uplink grant from the base station over the radio interface, the dynamic uplink grant containing scheduling information associated with transmission of the time-critical data;
keep the dummy data in the transmission buffer until the arrival of the time-critical data; and in response to arrival of the time-critical data, transmit the dummy data and the time-critical data over the radio interface to the base station based on the dynamic uplink grant.

17. The computer program product of claim 16, wherein:
the computing system is further configured to determine whether there is ongoing transmission of non-time-critical data between the computing system and the base station; and
the dynamic uplink scheduling request is generated in response to determining that there is no ongoing transmission of non-time-critical data.

18. The computer program product of claim 17, wherein:
in response to determining that there is ongoing transmission of non-time-critical data, the computing system is further configured to send a service request to the base station to establish a new user plane, and
the dynamic uplink scheduling request is generated after the new user plane is established to prioritize transmission of the time-critical data over the non-time-critical data.

19. The computer program product of claim 18, wherein:
the time, the frequency, or the volume of the time-critical data is a first time, a first frequency, or a first volume, and
the computing system is further configured to:
  determine a second time, a second frequency, or a second volume that the non-time-critical data are to arrive, and
  generate a configured uplink scheduling request containing data transmission periodicity set based on both (1) the first time, the first frequency, or the first volume of the time-critical data, and (2) the second time, the second frequency, or the second volume of the non-time-critical data.

20. The computer program product of claim 19, wherein the computing system is configured to transmit the time-critical data before the non-time-critical data in each transmission period.

* * * * *